US010354006B2

(12) United States Patent
Muthusamy et al.

(10) Patent No.: US 10,354,006 B2
(45) Date of Patent: Jul. 16, 2019

(54) SYSTEM, METHOD, AND RECORDING MEDIUM FOR WEB APPLICATION PROGRAMMING INTERFACE RECOMMENDATION WITH CONSUMER PROVIDED CONTENT

(71) Applicant: International Business Machines Corporation, Armonk, NY (US)

(72) Inventors: Vinod Muthusamy, Peekskill, NY (US); Wei Tan, Elmsford, NY (US); Fei Wang, Fremont, CA (US); John Erik Wittern, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 330 days.

(21) Appl. No.: 14/922,496

(22) Filed: Oct. 26, 2015

(65) Prior Publication Data
US 2017/0116326 A1    Apr. 27, 2017

(51) Int. Cl.
    *G06F 16/9537*    (2019.01)
    *G06F 17/27*    (2006.01)
    *G06F 8/10*    (2018.01)

(52) U.S. Cl.
    CPC .............. *G06F 17/273* (2013.01); *G06F 8/10* (2013.01); *G06F 17/27* (2013.01); *G06F 17/277* (2013.01); *G06F 17/2765* (2013.01)

(58) Field of Classification Search
    CPC .............. G06F 17/30675; G06F 17/273; G06F 17/277; G06F 17/30702; G06F 17/3097; G06F 17/30867; G06F 17/30864; G06F 17/3053; G06F 17/30011; G06F 17/30672; G06F 17/30554; G06F 17/2765;
    (Continued)

(56) References Cited

U.S. PATENT DOCUMENTS 7,127,004 B1 * 10/2006 Sonning ............ H03M 13/2707
                                                    375/295
7,296,019 B1 * 11/2007 Chandrasekar ....... G06F 17/273
(Continued)

FOREIGN PATENT DOCUMENTS

| CN | 103544623 A | * | 1/2013 | .............. G06F 17/30 |
| CN | 103544623 A | * | 11/2013 | .............. G06F 17/30 |
| CN | 103544623 A | | 1/2014 | |

OTHER PUBLICATIONS

Zhiheng Xu, Rong Lu ,Liang Xiang ,Qing Yang; Discovering User Interest on Twitter with a Modified Author-Topic Model; 2011; Institute of Automation Chinese Academy of Sciences Beijing, China; pp. 422-429.*

(Continued)

*Primary Examiner* — Jay A Morrison
*Assistant Examiner* — Antonio J Caiado
(74) *Attorney, Agent, or Firm* — Rahan Uddin, Esq.; McGinn IP Law Group, PLLC

(57) ABSTRACT

A method, system, and recording medium for web Application Programming Interface (API) recommendation, including given a plurality of service description document, gathering a bag of words from the document, generating a service-word matrix based on the bags of words describing the service descriptions, and given a query by a user, recommending a ranked list of services based on the service-word matrix.

20 Claims, 7 Drawing Sheets

(58) Field of Classification Search
CPC ....... G06F 17/27; G06F 8/10; G06Q 30/0631;
G06Q 30/02; G06N 99/005; H04L 67/22
USPC .................. 707/730, 734, 770, 728; 719/328
See application file for complete search history.

(56) References Cited

U.S. PATENT DOCUMENTS

| | | | | |
|---|---|---|---|---|
| 7,342,875 | B2* | 3/2008 | Hammons, Jr. | H04L 1/0618 370/208 |
| 7,409,383 | B1* | 8/2008 | Tong | G06F 17/30666 |
| 7,451,075 | B2* | 11/2008 | Mohammed | G06F 17/273 704/10 |
| 7,912,701 | B1* | 3/2011 | Gray | G06F 17/27 704/257 |
| 8,630,975 | B1* | 1/2014 | Guo | G06N 7/005 707/608 |
| 8,782,037 | B1* | 7/2014 | Barad | G06F 17/30864 707/723 |
| 8,996,350 | B1* | 3/2015 | Dub | G06F 16/93 704/1 |
| 9,471,560 | B2* | 10/2016 | Kida | G06F 17/273 |
| 9,600,134 | B2* | 3/2017 | Fox | G06F 3/0481 |
| 9,767,416 | B2* | 9/2017 | Tristan | G06F 16/355 |
| 10,147,044 | B2* | 12/2018 | Steele, Jr. | G06F 16/355 |
| 2002/0123919 | A1* | 9/2002 | Brockman | G06Q 30/02 379/112.06 |
| 2003/0208485 | A1* | 11/2003 | Castellanos | G06F 16/3326 |
| 2004/0260534 | A1* | 12/2004 | Pak | G06F 17/30864 704/7 |
| 2005/0177582 | A1* | 8/2005 | Baird-Smith | G06F 17/273 |
| 2006/0026152 | A1* | 2/2006 | Zeng | G06F 17/3071 |
| 2006/0184566 | A1* | 8/2006 | Lo | G06F 17/30038 |
| 2007/0118498 | A1* | 5/2007 | Song | G06F 17/30702 |
| 2007/0265831 | A1* | 11/2007 | Dinur | G06F 17/273 704/10 |
| 2008/0147788 | A1* | 6/2008 | Omoigui | G06F 17/3061 709/203 |
| 2008/0162520 | A1* | 7/2008 | Sarwar | G06F 17/2775 |
| 2008/0294621 | A1* | 11/2008 | Kanigsberg | G06F 17/30867 |
| 2009/0019395 | A1* | 1/2009 | Radom | G06F 3/0237 715/816 |
| 2009/0055732 | A1* | 2/2009 | Motaparti | G06F 3/0237 715/261 |
| 2010/0161611 | A1* | 6/2010 | Guo | G06F 16/94 707/738 |
| 2010/0278420 | A1* | 11/2010 | Shet | G06K 9/00369 382/156 |
| 2010/0321299 | A1* | 12/2010 | Shelley | G06F 1/1673 345/168 |
| 2011/0004588 | A1* | 1/2011 | Leitersdorf | G06F 17/30864 707/711 |
| 2011/0029636 | A1* | 2/2011 | Smyth | G06F 17/3089 709/217 |
| 2011/0179081 | A1* | 7/2011 | Ovsjanikov | G06F 17/30867 707/780 |
| 2011/0270820 | A1* | 11/2011 | Agarwal | G06F 17/273 707/709 |
| 2012/0239380 | A1* | 9/2012 | Cumby | G06F 17/2785 704/9 |
| 2013/0080164 | A1* | 3/2013 | Zanolin | G06F 17/273 704/235 |
| 2013/0086553 | A1* | 4/2013 | Grechanik | G06F 8/70 717/123 |
| 2014/0337372 | A1* | 11/2014 | Lee | G06F 8/30 707/767 |
| 2015/0095185 | A1* | 4/2015 | Katukuri | G06Q 30/0631 705/26.7 |
| 2015/0095330 | A1* | 4/2015 | Guo | G06F 17/30699 707/734 |
| 2015/0169385 | A1* | 6/2015 | Allen | G06F 9/541 719/328 |
| 2015/0286708 | A1* | 10/2015 | Tao | G06F 17/30675 707/730 |
| 2015/0317299 | A1* | 11/2015 | Park | G06F 3/167 704/275 |
| 2016/0012044 | A1* | 1/2016 | Franceschini | G06F 17/30628 707/722 |
| 2016/0203221 | A1* | 7/2016 | Rao | G06F 17/30864 707/707 |
| 2016/0239269 | A1* | 8/2016 | Cuomo | G06F 8/10 |
| 2016/0239551 | A1* | 8/2016 | Ovsjanikovs | G06F 17/30867 |
| 2017/0024663 | A1* | 1/2017 | Liu | G06N 99/005 |
| 2017/0091162 | A1* | 3/2017 | Emanuel | G06F 17/241 |
| 2018/0075024 | A1* | 3/2018 | Leydon | G06F 17/289 |
| 2018/0232442 | A1* | 8/2018 | Duesterwald | G06F 8/36 |

OTHER PUBLICATIONS

Ilker Yildirinn; Bayesian Inference: Gibbs Sampling; Aug. 2012; University of Rochester; all pages.*
Gomadam et al., A Faceted Classification Based Approach to Search and Rank Web APIs, 2008, 2008 IEEE International Conference on Web Services, all pages.*
Elgazzar et al., Clustering WSDL Documents to Bootstrap the Discovery of Web Services, Jul. 2010, School of Computing, Queen' s University, Canada, all pages.*
Turkel et al. Count Word Freqeuncies with Python, 2012-07-17, all pages.*
Hartmanis et al., ICSOC 2003 Conference Organization<b>, 2003, Springer, pp. 194-207.*
Abderrahmane Maaradji et, al., "Social Discovery and Composition of Web Services", Alcatel-Lucent Bell Labs France, Telecom SudParis, Servicearchitecture.wp.
Nikita R. Gurjar et, al., "Personalized QoS-Aware Web Service Recommendation Via Exploiting Location and Collaborative Filtering", International Journal of Advanced Research in Computer Science and Software Engineering, Department of Information Technology, Sipna College of Engineering & Technology, Amravati University, Maharashtra, India.

* cited by examiner

200 FIG. 2

WEB API RECOMMENDATION METHOD 200

SYSTEM, METHOD, AND RECORDING MEDIUM FOR WEB APPLICATION PROGRAMMING INTERFACE RECOMMENDATION WITH CONSUMER PROVIDED CONTENT

BACKGROUND

The present invention relates generally to web Application Programming Interface (API) recommendations, and more particularly, but not by way of limitation, to a system, a method, and a recording medium for recommending a web API using consumer-provided content.

Conventional systems provide matching between quality of service (QoS) information exposed by providers and required by consumers respectively, or the descriptions of services created by service providers. However, the conventional systems result in information asymmetry in that providers aim to convince consumers of their offerings, and are thus likely to expose biased information. Furthermore, the conventional systems' information is static over time.

Other conventional systems merely characterize the latent topics between service descriptions and queries, and then propose a matching to the user's needs based on the topic relevance. However, the conventional systems directly use the provider's web API descriptions which conventionally have not led the user to the correct web API for their needs.

That is, the above conventional systems, and other conventional web API recommendation systems are limited in their application in that they are only directed to viewing data provided by the web API providers and attempt to match a user with an appropriate web API based on the providers descriptions.

Thus, there is a technical problem in the conventional systems that the methods of matching a user with an appropriate web API account, specific to the user's requirements using the provider side information, can be biased, static, and use specific market tested wording to convince users to consume the specific web API when the web API may not be the best match for the user.

SUMMARY

In an exemplary embodiment, the present invention can provide a method for web Application Programming Interface (API) recommendation, including given a plurality of service description documents (or any natural-language document containing information on a service or, even better, multiple services) each describing one or more services, gathering a bag of words from each document; generating a service-word matrix based on the many bags of words describing the service descriptions; and given a query by a user, recommending a ranked list of services based on the service-word matrix.

Further, in another exemplary embodiment, the present invention can provide a non-transitory computer-readable recording medium recording a web Application Programming Interface (API) recommendation program, the program causing a computer to perform: given a plurality of service description documents, gathering a bag of words from the document, generating a service-word matrix based on the many bags of words describing the service descriptions, and given a query by a user, recommending a ranked list of services based on the service-word matrix.

Even further, in another exemplary embodiment, the present invention can provide a system for web Application Programming Interface (API) recommendation, including a gathering device configured to gather a bag of words from the document based on given a plurality of service description documents, a generating device configured to generate a service-word matrix based on the many bags of words describing the service descriptions, and a recommending device configured to recommend a ranked list of services based on the service-word matrix based on a query by a user.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
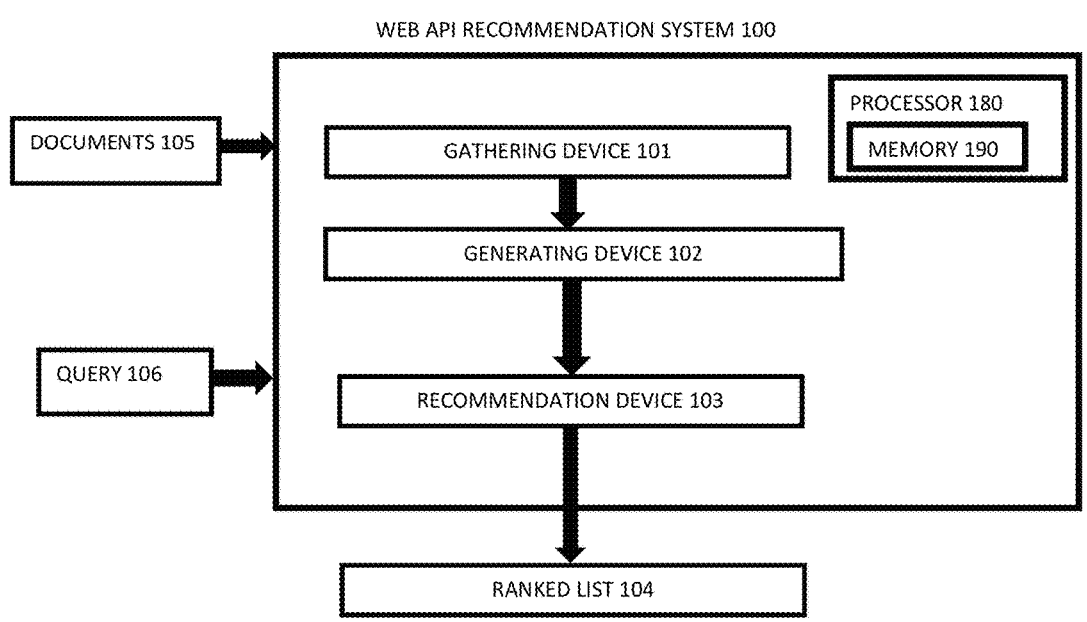
FIG. 1 exemplarily shows a block diagram illustrating a configuration of a web API recommendation system 100.

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the web API recommendation system 100 includes a gathering device 101, a generating device 102, and a recommendation device 103. The web API recommendation system 100 includes a processor 180 and a memory 190, with the memory 190 storing instructions to cause the processor 180 to execute each device of the web API recommendation system 100.

Figure 4:
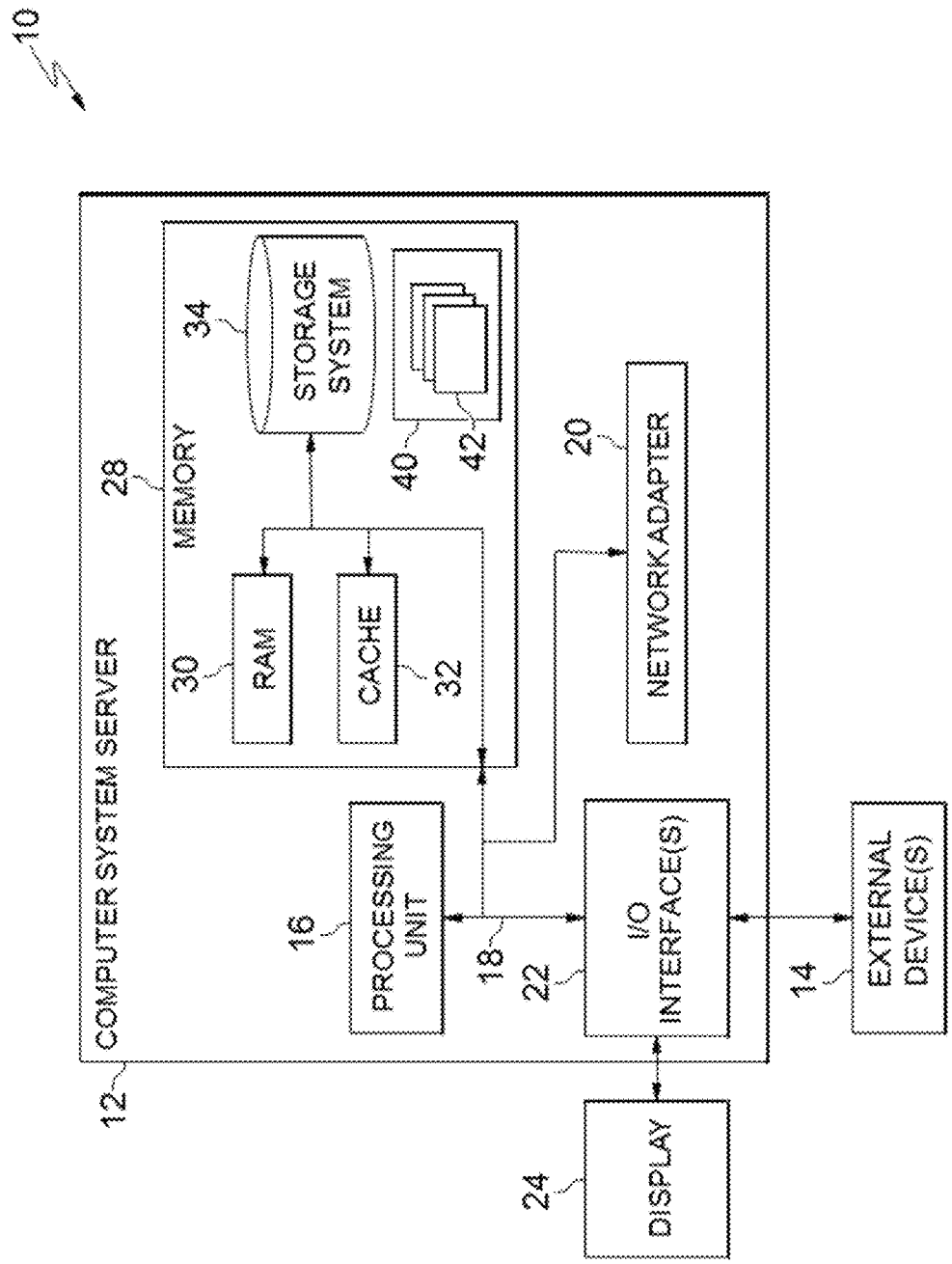
FIG. 4 depicts a cloud computing node according to an embodiment of the present invention.
Figure 5:
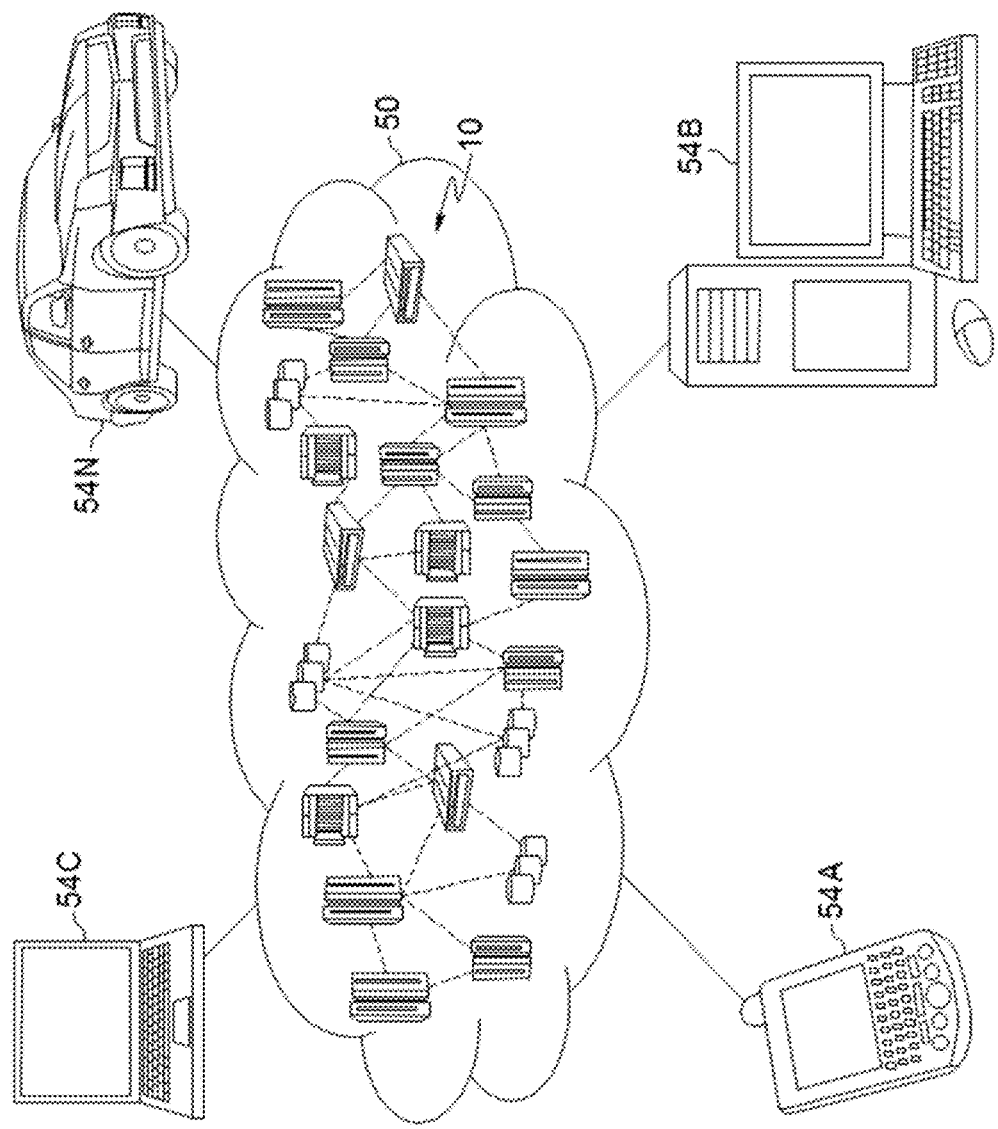
FIG. 5 depicts a cloud computing environment according to another embodiment of the present invention.
Figure 6:
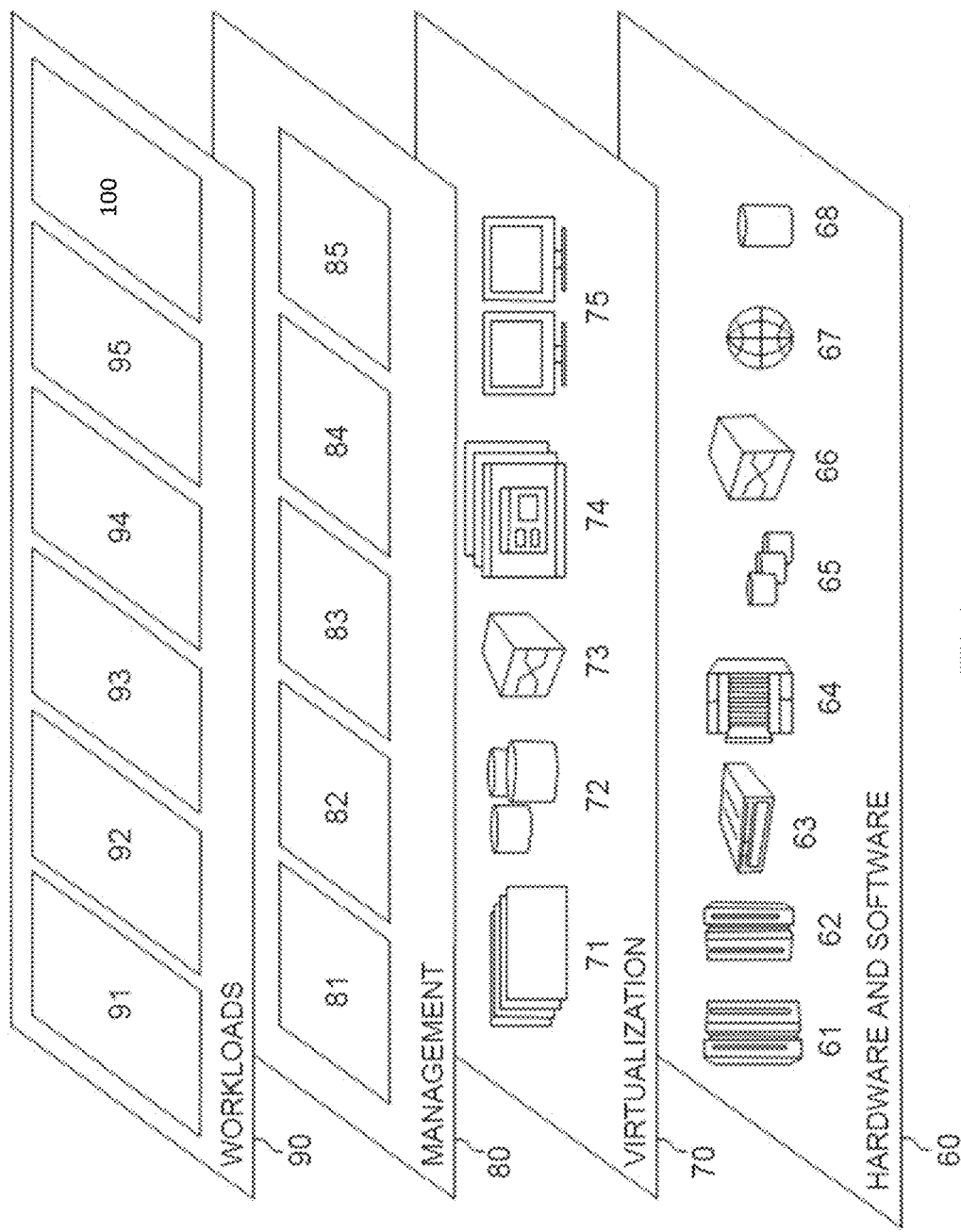
FIG. 6 depicts abstraction model layers according to an embodiment of the present invention.

Although as shown in FIGS. 4-6 and as described later, the computer system/server 12 is exemplarily shown in cloud computing node 10 as a general-purpose computing device which may execute in a layer of the web API recommendation system 100 (FIG. 6), it is noted that the present invention can be implemented outside of the cloud environment.

The web API recommendation system 100 receives documents 105 (i.e., a corpus of consumer-provided, natural language-based data about web APIs) in which the gathering device 101 gathers a "bag of words" from each document in the documents 105. The gathering device 101 gathers the many bags of words from the documents 105 (i.e., textual documents) including a description of services. A "bag of words" refers to all the words in one document irrelevant of the sequence that the words appear or other criteria.

It should be noted that "a single document" includes "a bag of words" and that "many documents" include "many bags of words". That is, many documents include many separate bags of words, i.e., each document has one bag of words. The bag of words are not mixed from different documents.

That is, contrary to gathering devices that depend on the sequence of words in a sentence to determine meaning, the gathering device 101 merely gathers a bag of words (i.e., all the words in the document) to determine a frequency of the appearance of each word in the bag of words as described later. In this sense, the gathering device 101 merely reads the documents to obtain all words from the document and stores the words as the bag of words. In other words, a bag of words is merely all the words of one document without consideration of the sequence of words.

For example, the gathering device 101 can gather many bags of words from a mashup repository like ProgrammableWeb.com™, a QA (question and answer) repository like Stackoverflow™, from articles about services, etc. That is to say, given a collection of documents, each about a collection of services, the gathering device 101 gathers the textual descriptions (i.e., one bag of words from one document), and the component services.

The gathering device 101 extracts the component services from the documents 105 which may be based on component services being explicitly stated as in the case of mashup descriptions or may rely on processing, for example matching of QA threads against known API names and base URLs.

The gathering device 101 can gather a bag of words of a service including a name, tags, descriptions, creation time, etc., from mashup documents including names, descriptions, list of component services, creation times, etc., from QA documents including names, descriptions, list of component services, creation times, etc., from articles including names, content/body, list of component services, creation times, etc.

The gathering device 101 preprocesses the textual description within the text and performs at least one of tokenization (e.g., splitting documents into words), pruning (i.e., removing irrelevant words such as "a", "the", etc. or removing words matching others closely, thus not adding substantial benefits to characterize web APIs), stemming (i.e., words to their word stem), and spell correction for the bag of words.

That is, since the bags of words can be gathered from blogs or user entered data, there can be a plurality of spelling errors that the gathering device corrects before forming the bags of words.

The generating device 102 receives the bags of words from the gathering device 101 and generates the services profile (SP) as a service-word matrix (with dimension |S|*|W|, in which S is the set of services, and W is the set of words).

To associate web APIs with terms from the bag of items, the generating device 102 uses an author topic modeling (ATM), where the generating device 102 models the bags of words described above as the documents and the web APIs as authors to fit the ATM model.

That is, the conventional ATM model has been modified in the web API recommendation system 100 for the generating device 102 such that the ATM of the generating device 102 learns how the topics that the authors (web APIs) relate to from the documents.

The generating device 102 generates the service-word matrix using the ATM model by assuming that each document is generated by choosing an author, choosing a topic from the distribution over the topics of this author, and/or choosing a word from the corresponding topic.

Figure 7:
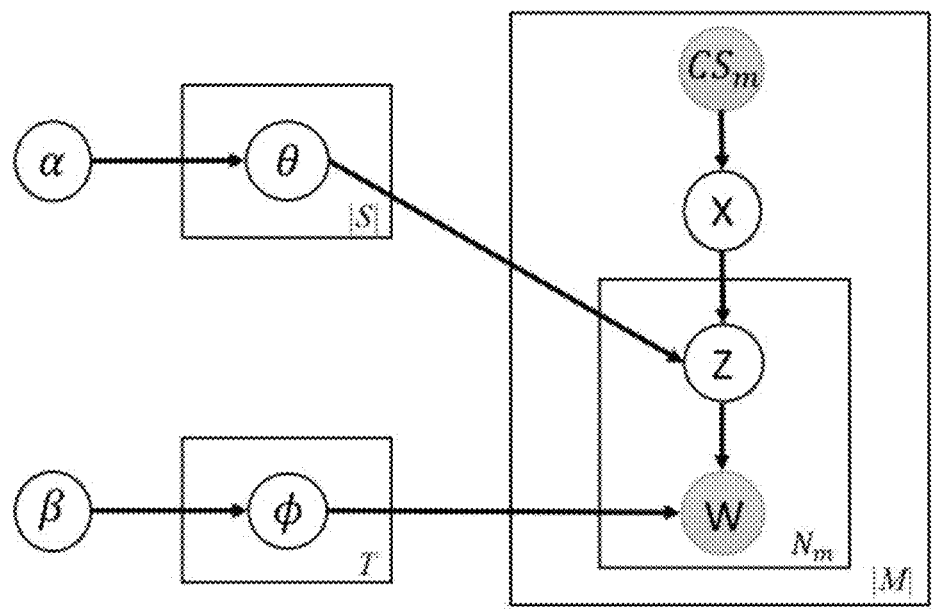
FIG. 7 exemplary shows a graphical model of the mashup description creation process, based on the author topic model.

As exemplarily shown in FIG. 7, the graphical model of the mashup-document creating process by the generating device 102 uses equations (1), (2), and (3) below:

For each topic z=1;T

Draw $\phi_z \sim \text{Dirichlet}(\beta)$         1)

For each service s in S

Draw $\theta_s \sim \text{Dirichlet}(\alpha)$         2)

For each word $w_{mi}$

Draw a service $x_{mi}$ uniformly from $CS_m$

Draw a topic $z_{mi} \sim \text{Multinomial}(\theta_{x_{mi}})$

Draw a word $w_{mi} \sim \text{Multinomial}(\phi_{z_{mi}})$         3)

That is, the generating device 102 determines the relations between web APIs and the bag of words based on the relationship between services and topics, and the relationship between topics and words.

Thus, the generating device 102 reconstructs service profiles which are derived profiles including a set of topics with consisting words (i.e., the topic-word relation), each service (i.e., author's) correlation with topics, (i.e., the service-topic relation), and generates the service-word matrix SP derived during the generation of the set of topics and the authors correlation with topics.

The service-word matrix can be obtained from a known Gibbs sampling process when generating the service-topic relation and the topic-word relation.

The recommendation device 103 receives the service-word matrix from the generating device 102. The recommendation device 103 uses the service-word matrix to determine the frequency that some word has been used to describe a particular service in all historical mashup descriptions, QA, comments etc.

That is, the recommendation device 103 uses equation (4) below to calculate the probability that service "s" shows up when the document contains word "w"

$$p(s|w) = \frac{SP(s, w)}{\sum_k SP(k, w)} \quad (4)$$

A user inputs a query 106 into the web API recommendation system 100. The query includes at least one word. More preferably, the query includes a bag of words such that the multiple words can provide better matching to the service-word matrix generated by the generating device 102. In other words, the user enters words that the user wishes to find a web API to fit the requirements. Generally, the more words entered, the better the match (or similarity with the web API to fit the users' needs).

When the user enters a query "Q" into the web API recommendation system 100, the recommendation device 103 calculates the score of service "s" by accumulating the contribution of every word in the query "Q" using equation (5) below:

$$r(s, Q) = \sum_{w \in Q} p(s|w) = \sum_{w \in Q} \frac{SP(s, w)}{\sum_k SP(k, w)} \quad (5)$$

The recommendation device 103 recommends services based on the above accumulated scores calculated in equation (5). Further, the recommendation device 103 outputs a ranked list 104 such that the user can receive a ranked list of services as exemplarily shown in FIG. 3. In other words, if a user inputs the query with a word that matches a service having the highest accumulated score, the recommendation device 103 will determine that there is a higher probability that the user may want to use the service. The greater the number of words in the query that match the higher probability items calculated by the recommendation device, the higher the service will be on the ranked list.

That is, the recommendation device 103 determines the probability that a certain web API appears in a document containing a certain word. Consequently, for a given user input query 106, the recommendation device 103 can determine the probability with which it matches web APIs and recommend a ranked list 104 of the services.

Figure 3:
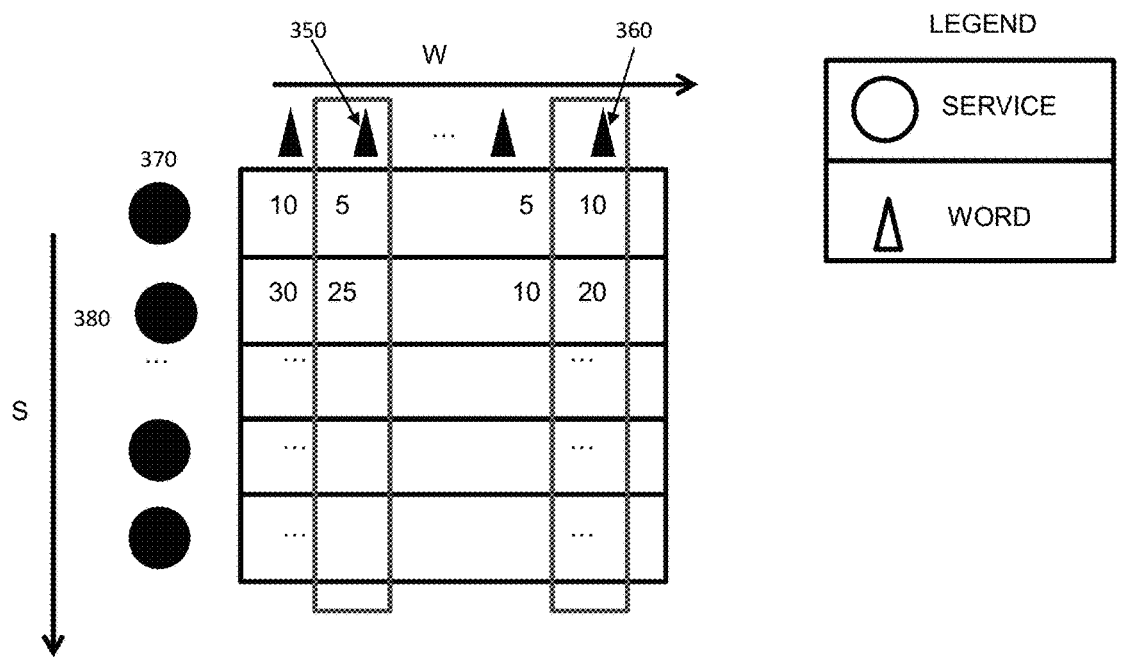
FIG. 3 exemplary shows a ranked list 107 of services recommended by the recommendation method 200.

As exemplarily shown in FIG. 3, the user inputs a query 106 containing a first word 350 (second triangle) and a second word 360 (fourth triangle). The recommendation device 103 uses the bag of words gathered by the gathering device 101 and the service-word matrix received from the generating device 102 to determine the frequency that a word occurs in the service-word matrix gathered by the gathering device. As exemplarily shown in FIG. 3, the first service 370 in the first row contains the first word 350 input by the user 5 times and the second word 360 input by the user 10 times. The second row 380 contains the first word 350 input by the user 25 times and the second word 360 input by the user 20 times.

Thus, the recommendation device 103 outputs the ranked list 104 that would rank the service of the second row 380 as the best service for the user, and then the service of the first row as the second best service.

Thus, the user can then decide which API service to consume based on the ranked list.

Figure 2:
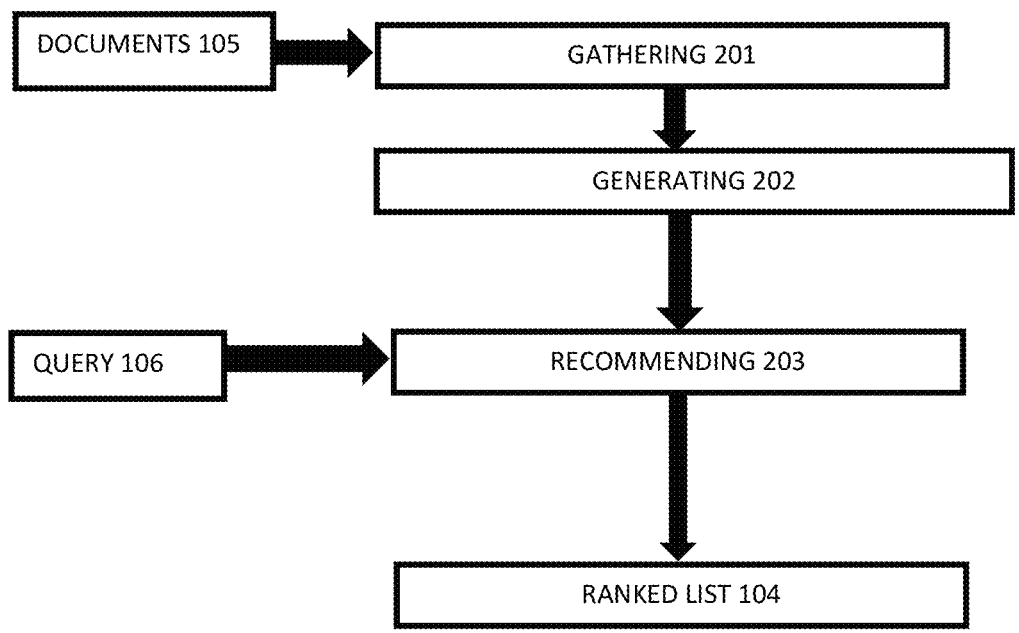
FIG. 2 exemplarily shows a high level flow chart for a web API recommendation method 200.

FIG. 2 shows a high level flow chart for a web API recommendation method 200 that receives documents 105 as inputs.

Step 201 gathers a bag of words from each document 105 with it including a description of services.

Step 202 generates the service-word matrix using the ATM model by assuming that each document is generated by choosing an author, choosing a topic from the distribution over the topics of this author, and/or choosing a word from the corresponding topic.

Step 203 receives the service-word matrix, determines the frequency some word has been used to describe a particular service, and recommends services based on the accumulated scores calculated in equation (5) as a ranked list 104.

In view of the foregoing and other problems, disadvantages, and drawbacks of the aforementioned conventional techniques, it is desirable to provide a new and improved web Application Programming Interface (API) recommendation system as described above which enables a user to input a query of words for the specifications and parameters desired from the web API and compare the user entered information with gathered information about the web API not provided by the web API provider.

An exemplary aspect of the disclosed invention provides a system, method, and non-transitory recording medium for recommending a web API using consumer-provided content. Thus, the disclosed invention can provide a technical solution to the technical problem in the conventional approaches by relying on descriptions of mashups or applications using APIs, blogs, question-and-answer threads regarding APIs, or articles about APIs, from trade publications or technical publications. Using this input, the exemplary aspect can utilize a modified author topic modeling (ATM) to assign terminology to web APIs in a mathematical model, which is ultimately matched against users search queries, to recommend web APIs such that the recommendation is based on consumer-provided information. Such consumer-provided information is more reliable than such created by providers. Further, since the system requires as input documents containing natural language, there is a larger data set to analyze when recommending a user to a specific web API.

Further, it should be noted that although the embodiments herein are directed to recommending a specific web API for a user, any service can be recommended using the recommendation system 100 by receiving documents 105 (i.e., a corpus of consumer-provided, natural language-based data about any data set or service) in which the gathering device 101 gathers many bags of words from the documents 105. For example, household services such as plumbing, electricians, computer repair, etc. can be recommended using the recommendation system 100.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the web API recommendation 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A method for web Application Programming Interface (API) recommendation, comprising:
given a plurality of service description documents as input documents including natural language text, gathering a bag of words from each document, the natural language text being based on consumer-provided information collected from a consumer of the API of which did not author the API;
generating a service-word matrix based on the bags of words describing a technical capability of the service descriptions by setting that each document is generated by choosing a consumer, choosing a topic from a distribution over topics of the consumer, and choosing a word from a corresponding topic and determining relationships between web APIs and the bag of words based on a relationship between the services and the topics, and a relationship between the topics and the words; and
given a query by a consumer including a required technical capability of the API, creating a ranked list of services based on the service-word matrix for output by calculating a score of service by accumulating a frequency of every word in the query as compared with the service-word matrix,
wherein the recommending calculates the frequency that a word describes the technical capability of a particular service based on the bags of words gathered by the gathering,
wherein, when the consumer inputs the query with a word that matches the word having a highest frequency describing the particular service, the recommending determines that the service is highest on the ranked list,
wherein an order of the services on the ranked list is determined by ranking a score of the query by the consumer with the frequency of the word in the service descriptions, the higher the frequency of the word in the service description in relation to the query by the consumer, the higher the recommending puts the service on the ranked list, and
wherein author-topic modeling (ATM) is used for deriving the service-word matrix indicating a service-word relationship from the document provided by the consumer.

2. The method of claim 1, wherein the gathering gathers the bags of words from a collection of service description documents.

3. The method of claim 1, wherein service profiles are reconstructed using the author-topic modeling (ATM).

4. The method of claim 2, wherein service profiles are reconstructed using the author-topic modeling (ATM), services of the ATM comprising authors, and documents of the ATM comprising a corpus of consumer-provided information.

5. The method of claim 1, wherein the query by the consumer comprises a bag of words.

6. The method of claim 1, wherein the service-word matrix is obtained from a sampling process when generating a service-topic relation and a topic-word relation.

7. The method of claim 1, wherein the recommending calculates a score of the service by accumulating a contribution of every word in the query by the consumer.

8. The method of claim 1, wherein an accuracy of the order of the ranked services on the list is greater when the query comprises a greater number of words.

9. The method of claim 1, wherein the gathering preprocesses the bags of words by at least one of tokenization, pruning, stemming, and spell correction.

10. The method of claim 3, wherein the generating reconstructs the service profiles that include derived profiles having a set of topics with the words, each service correlation with topics, and subsequently generates the service-word matrix SP.

11. A. non-transitory computer-readable recording medium recording a web Application Programming Interface (API) recommendation program, the program causing a computer to perform:
given a plurality of service description documents as input documents including natural language text, gathering a bag of words from each document, the natural language text being based on consumer-provided information collected from a consumer of the API of which did not author the API ;
generating a service-word matrix based on the bags of words describing a technical capability of the service descriptions by setting that each document is generated by choosing a consumer, choosing a topic from a distribution over topics of the consumer, and choosing a word from a corresponding topic and determining relationships between b APIs and the bag of words based on a relationship between the services and the topics, and a relationship between the topics and the words; and
given a query by a consumer including a required technical capability of the API, creating a ranked list of services based on the service-word matrix for output by calculating a score of service by accumulating a frequency of every word in the query as compared with the service-word matrix,
wherein the recommending calculates the frequency that a word describes the technical capability of a particular service based on the bags of words gathered by the gathering,
wherein, when the consumer inputs the query with a word that matches the word having a highest frequency describing the particular service, the recommending determines that the service is highest on the ranked list,
wherein an order of the services on the ranked list is determined by ranking a score of the query by the consumer with the frequency of the word in the service descriptions, the higher the frequency of the word in the service description in relation to the query by the consumer, the higher the recommending puts the service on the ranked list, and
wherein author-toxic modeling (ATM) is used for deriving the service-word matrix indicating a service-word relationship from the document provided by the consumer.

12. The non-transitory computer-readable recording medium of claim 11, wherein the gathering gathers the bags of words from a collection of service description documents.

13. The non-transitory computer-readable recording medium of claim 11, wherein service profiles are reconstructed using the author-topic modelling (ATM).

14. The non-transitory computer-readable recording medium of claim 12, wherein service profiles are reconstructed using the author-topic modelling, (ATM), services of the ATM comprising authors, and documents of the ATM comprising a corpus of consumer-provided information.

15. The non-transitory computer-readable recording medium of claim 11, wherein the query by the consumer comprises a bag of words.

16. The non-transitory computer-readable recording medium of claim 11, wherein the service-word matrix is obtained from a. sampling process when generating a service-topic relation and a topic-word relation.

17. A system for web Application Programming Interface (API) recommendation, comprising:

a gathering device configured to gather a bag of words from each document of a plurality of service description documents as input documents including natural language text, the natural language text being based on consumer-provided information collected from a consumer of the API of which did not author the API ;

generating a service-word matrix based on the bags of words describing a technical capability of the service descriptions by setting that each document is generated by choosing a consumer, choosing a topic from a distribution over topics of the consumer, and choosing a word from a corresponding topic and determining relationships between web APIs and the bag of words based on a relationship between the services and the topics, and a relationship between the topics and the words; and given a query by a consumer including a required technical capability of the API, creating a ranked list of services based on the service-word matrix for output by calculating a score of service by accumulating a frequency of every word in the query as compared with the service-word matrix, wherein the recommending calculates the frequency that a word describes the technical capability of a particular service based on the bags of words gathered by the gathering, wherein, when the consumer inputs the query with a word that matches the word having a highest frequency describing the particular service, the recommending determines that the service is highest on the ranked list, wherein an order of the services on the ranked list is determined by ranking a score of the query by the consumer with the frequency of the word in the service descriptions, the higher the frequency of the word in the service description in relation to the query by the consumer, the higher the recommending puts the service on the ranked list, and wherein author-topic modeling (ATM) is used for deriving the service-word matrix indicating a service-word relationship from the document provided by the consumer.

18. The method of claim 1, wherein the service-word matrix is based on the frequency that some words have been used to describe a particular service in all historical descriptions of the service.

19. The method of claim 1, wherein each document is generated via the ATM by selecting an author of the API, selecting a topic from a distribution over topics written by the author, and selecting a word from the corresponding topic.

20. The method of claim 18, wherein each document is generated via the ATM by selecting an author of the API, selecting a topic from a distribution over topics written by the author, and selecting a word from the corresponding topic.

* * * * *